(12) United States Patent
Balon et al.

(10) Patent No.: US 7,248,871 B2
(45) Date of Patent: Jul. 24, 2007

(54) METHOD AND SYSTEM FOR IMPROVING MOBILE RADIO COMMUNICATIONS

(75) Inventors: Marc Balon, Villers-la-Ville (BE); Francois Verzele, Brussels (BE)

(73) Assignee: Orange SA, Paris, Cedex (FR)

( * ) Notice: Subject to any disclaimer, the term of this patent is extended or adjusted under 35 U.S.C. 154(b) by 69 days.

(21) Appl. No.: 11/140,116

(22) Filed: May 26, 2005

(65) Prior Publication Data

US 2005/0282538 A1    Dec. 22, 2005

(30) Foreign Application Priority Data

May 28, 2004    (EP)    ................... 04291347

(51) Int. Cl.
*H04Q 7/20*    (2006.01)
(52) U.S. Cl. .................................. 455/432.1
(58) Field of Classification Search ............ 455/435.1, 455/433, 432.1, 414.2, 423, 67.11, 456
See application file for complete search history.

(56) References Cited

U.S. PATENT DOCUMENTS

| | | | |
|---|---|---|---|
| 6,603,966 B1 | 8/2003 | Sheffield | 455/423 |
| 7,162,236 B2 * | 1/2007 | Dorenbosch et al. | 455/432.1 |
| 2003/0176186 A1 * | 9/2003 | Mohammed | 455/432.1 |

FOREIGN PATENT DOCUMENTS

| | | |
|---|---|---|
| EP | 1 041 830 A1 | 10/2000 |
| EP | 1 081 972 A2 | 7/2001 |

* cited by examiner

*Primary Examiner*—Nick Corsaro
*Assistant Examiner*—Shannon R. Brooks
(74) *Attorney, Agent, or Firm*—Haverstock & Owens LLP (57) ABSTRACT

A method of identifying areas for improving radio communications coverage in a mobile radio network under analysis. The method comprises detecting cancel location signalling data, update location signalling data and service signalling data. The cancel location signalling data is generated to cancel a registration of mobile user equipment from a visitor subscriber database of the analyzed mobile radio network. The cancel location signalling data includes mobile subscriber identifiers of the mobile user equipment. The location update signalling data informs the home subscriber database of the home network of the mobile user equipment that the mobile user equipment is to be registered as having roamed to a visitor subscriber database of at least one other mobile network. The location update signalling data includes identifiers of the visitor subscriber database and the mobile subscriber identifier of the user equipment being registered. The service signalling data is associated with mobile originated calls made by mobile user equipment as part of service provisioning to the mobile radio network being analyzed. The service signalling data includes mobile subscriber identifiers of the mobile user equipment and identifiers of cells of the analyzed mobile radio network from which the mobile originated calls were made. The method includes correlating the cancel location signalling data and the update location signalling data with respect to the mobile subscriber identifiers of the mobile user equipment to identify mobile subscribers lost to the other mobile network. The method identifies areas of relative loss of service of the analyzed mobile radio network by identifying, from the subscriber identity numbers, a number of the lost mobile subscribers which had made mobile originated calls from cells identified by the cell identifiers of the service signalling data.

16 Claims, 6 Drawing Sheets

| Location Area Code | Cell ID | Count of IMSI | Delta Time Minimum | Delta time (min.) Average |
|---|---|---|---|---|
| 0069 | 3BF2 | 48 | 1 | 8 |
| 005A | B982 | 27 | 1 | 11 |
| 026E | 695B | 27 | 1 | 13 |
| 006C | 0D7E | 22 | 2 | 13 |
| 007D | 310D | 18 | 1 | 15 |
| 02B2 | 07BC | 18 | 1 | 17 |

METHOD AND SYSTEM FOR IMPROVING MOBILE RADIO COMMUNICATIONS

FIELD OF THE INVENTION

The present invention relates to methods and systems for identifying areas for improving radio communications in mobile radio networks.

BACKGROUND OF THE INVENTION

Mobile radio networks provide a facility for subscribers to communicate via a radio access interface, which conveys radio signals representing data between mobile user equipment and base stations of the mobile radio network. Each of the base stations provides a radio coverage area within which radio communications with the user equipment can be made. An operator of the mobile radio network is therefore able to generate revenue from mobile communications. However, an efficiency of the radio coverage provided by the base stations may determine the amount of revenue that a mobile operator can generate from a mobile radio network. If the radio coverage is deficient in some way then a mobile subscriber may communicate via a competitor's mobile network, rather than a first network with which the mobile subscriber has communicated. The first network operator may therefore lose an opportunity to generate revenue from that communication and any further communications made via the competitor's mobile network.

As will be appreciated therefore identifying areas of a coverage area of a mobile radio network, which can be improved, is desirable in order to reduce a loss of communications traffic and therefore revenue from communications for an operator's network.

SUMMARY OF INVENTION

According to the present invention there is provided a method of identifying areas for improving radio communications coverage in a mobile radio network under analysis. The method comprises detecting cancel location signalling data, update location signalling data and service signalling data. The cancel location signalling data is communicated between a home subscriber database of a home mobile network of mobile user equipment and a visitor subscriber database of the analysed mobile radio network cancelling a registration of the mobile user equipment from the visitor subscriber database of the analysed mobile radio network. The cancel location signalling data includes mobile subscriber identifiers of the mobile user equipment. The location update signalling data informs the home subscriber database of the home network of the mobile user equipment that the mobile user equipment is to be registered as having roamed to a visitor subscriber database of at least one other mobile network. The location update signalling data includes identifiers of the visitor subscriber database and the mobile subscriber identifier of the user equipment being registered. The service signalling data is associated with mobile originated calls made by mobile user equipment as part of service provisioning to the analysed mobile radio network. The service signalling data includes mobile subscriber identifiers of the mobile user equipment and identifiers of cells of the analysed mobile radio network from which the mobile originated calls were made. The method includes correlating the cancel location signalling data and the update location signalling data with respect to the mobile subscriber identifiers of the mobile user equipment to identify mobile subscribers lost to the other mobile network. The method identifies areas of relative loss of service of the analysed mobile radio network by identifying, from the mobile subscriber identifiers, a number of the lost mobile subscribers which had made mobile originated calls from cells identified by the cell identifiers of the service signalling data.

The areas of relative loss of service may be identified from the number of mobile user equipment of the analysed mobile radio network making mobile originated calls which are subsequently registered with the other mobile network within a predetermined time or for which the registration of the mobile user equipment is cancelled from the analysed mobile network within a predetermined time. The predetermined time may for example be associated with a likely distance that the user equipment may travel from the cell identified by the cell identifier between making the mobile originated call and being registered with the other mobile network or the registration of the mobile subscriber being cancelled from the analysed mobile network.

Embodiments of the present invention provide an estimate of a location within a radio coverage area of a mobile network where communications from mobile user equipment are lost to another network. Accordingly, an improvement can be made to radio coverage in these areas, thereby recovering revenue associated with the loss of communications to other operators. Unlike conventional techniques which utilise measurements based on the signal strength of radio signals, embodiments of the present invention correlate signalling messages sent via fixed network components of the mobile radio network. Signalling messages are captured within the mobile radio network and correlated with each other in order to identify an event in which a mobile user equipment roams to a network other than its home network, for example in another country and is subsequently lost to another network.

After roaming to a network other than the home network of the mobile subscriber, the mobile user equipment makes a mobile originating call, generating service signalling data. In accordance with one example the service signalling data may be a Customisation Application Mobility Enhanced Logic (CAMEL) Application Part Initial Detection Point (IDP) which comprises signalling data communicated as part of a CAMEL standard to the home network. The service signalling in the form of a CAP-IDP includes the mobile subscriber identifier of the mobile user equipment and an identifier of the cell of the visited mobile radio network from which the mobile originating call was made. In the event that the mobile user equipment subsequently communicates via a different visited mobile network from the network under analysis, a lost communication event will be identified by correlating location update signalling data and cancel location signalling data. The location update signalling data and the cancel location signalling data may be communicated in accordance with a Mobile Application Part (MAP) signalling protocol. By identifying a number of events within a predetermined time for a cell identified in the service signalling data, a relative location for the relative loss of service is provided. Accordingly a network operator may take appropriate action to improve the radio coverage area from that cell.

Home subscriber database is a term, which has been adopted to identify an element in a mobile network, which is responsible for maintaining information about a subscriber, including an identification of a mobile network via which the subscriber is currently communicating. The term "home subscriber database" has been used to include a home location register and a home subscriber server which are terms used for this element in second generation mobile networks and third generation mobile networks respectively. As will be appreciated therefore other terms may be used for this element but will still fall within the term home subscriber database. Correspondingly, the term visited subscriber database includes the terms "visitor location register" and "visitor subscriber server" as well as other elements, which perform this function in mobile network architectures.

Various further aspects and features of the present inventions are defined in the appended claims. Other aspects of the invention include a system, an analysing data processor and a computer program.

BRIEF DESCRIPTION OF THE DRAWINGS

Embodiments of the present invention will now be described by way of example only with reference to the accompanying drawings where like parts are provided with corresponding reference numerals and in which.

DESCRIPTION OF THE EXAMPLE EMBODIMENTS

Figure 1:
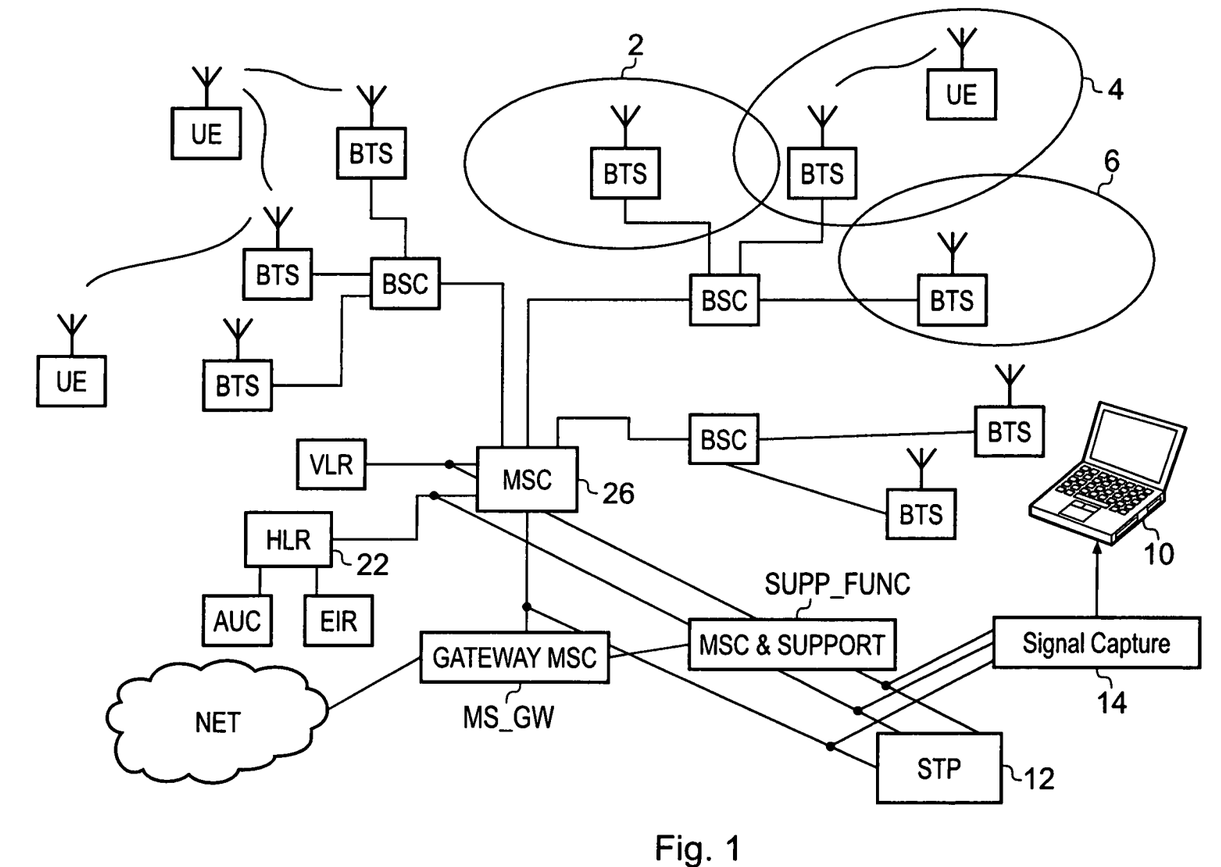
FIG. 1 is a schematic block diagram of a mobile radio network according to the Global System for Mobiles (GSM) standard adapted to include parts for analysing the performance of a visited mobile network.

FIG. 1 provides an example schematic block diagram of a mobile radio network according to the Global System for Mobiles (GSM) standard. In FIG. 1 a mobile switching centre MSC is connected to a plurality of base station controllers BSC. Each of the base station controllers BSC are connected to a plurality of base transceiver stations BTS. The base transceiver stations BTS and the base station controllers BSC to which they are connected form base station sub-systems. Data is communicated via an air interface in accordance with the GSM standard between mobile user equipment UE and one of the base transceiver stations BTS with which the mobile user equipment UE is currently affiliated via radio signals. Whilst a mobile user equipment UE is within a coverage area 2, 4, 6 provided by a base transceiver station BTS, radio communications are available through that base transceiver station BTS for transmitting and receiving data via the air interface.

Also forming part of the GSM network shown in FIG. 1 is a visitor location register VLR which maintains a current location of each mobile subscriber which has roamed to the mobile network as a visited network. The VLR provides an indication of which of the base stations or group of base stations a mobile user equipment UE may be currently affiliated. The GSM network also includes a home location register HLR which stores information specific to each subscriber to the mobile network which forms the home network for that subscriber. For example the HLR will store an indication of a visited mobile network to which a mobile subscriber has roamed, including an indication of the VLR of the visited network. The home location register HLR also has access to an equipment identity register EIR to provide a facility through which a network operator may track stolen or malfunctioning terminals. The home location register HLR also includes an authentication centre AUC which is used to store information associated with security features provided by the network.

The mobile switching centre MSC is connected to a gateway MSC MSC_GW which provides a facility for connecting the mobile switching centre MSC to other telecommunications networks which may include a public switched telephone network. An MSC support function SUPP_FUNC is also connected to the gateway MSC MSC_GW. More details on the GSM network may be found in a publication entitled "GSM, CDMA1 and 3G systems" by R. Steel ET AL published by Willie ISBN 0471491853.

Although FIG. 1 provides an example of a second generation GSM network, it will be appreciated that embodiments of the present invention find application with other types of mobile networks such as for example 2.5G and 3G operating in accordance with the Universal Mobile Telecommunications System.

A mobile user equipment which has roamed to a network other than its home network may select a visited mobile network either automatically or manually. In manual mode the user is presented with a list of available networks and invited to choose a preferred network. In an automatic mode, the user equipment may use a set of rules to find an appropriate network to visit. These rules may be included in the Subscriber Identity Module (SIM) card of the user equipment and may be used to ensure that a roaming subscriber visits a network preferred by the operator of the subscriber's home network.

In FIG. 1 a Signalling Transfer Point STP 12 provides a concentration point for signalling communications between the mobile radio network and other networks. Attached to the STP 12 is a signalling capture device 14, which detects signalling data. The signalling data includes signalling messages communicated for example, to and from the MSC, the VLR, and the HLR of the mobile network. As will be explained shortly the signalling data captured by the signalling capture device 14 are used to detect a loss of service within a visited mobile network. The detection of the loss of service is made by identifying an event where a mobile subscriber initiates a mobile originated call via the visited mobile network. The mobile originated call triggers the communication of service signalling data associated with a CAMEL signalling communication such as a CAMEL Application Part (CAP) Initial Detection Point (IDP). The CAP IDP identifies the mobile user equipment from the International Mobile Subscriber Identifier (IMSI), a cell of the visited network from which communication was made and the VLR of the visited mobile network. The user equipment having roamed to the visited network may also generate a location update, which is communicated to the HLR of the home mobile network. If the HLR subsequently receives an update that the user equipment is now communicating via another VLR of a different visited network, this location update represents a loss of service from the first visited network. By detecting service signalling data associated with a CAMEL signalling communication such as a CAP-IDP, an indication of the cell within the first visited network is provided, so that an identification of a loss of service from that cell can be determined.

The time at which the update of the HLR to the second VLR of the different visited network with respect to a time at which the mobile originated call generated the CAP IDP will determine an accuracy in respect of the loss of service measurement associated with a cell. By determining the time at which the update of the HLR takes place from the first to the second VLR from the time at which the CAP IDP information is received, a relative measure of correlation of the loss of service is provided. The longer a time window within which results are counted for a given cell, the greater the number of events will be included in the loss of service measurement and therefore the greater the statistical sample. However, given that the speed of the mobile is unknown, and that the direction of travel of the mobile is unknown, the greater the time window within which results are counted, the less accurate the results will be with respect to the cell. This is because for example a high speed mobile will have travelled some distance from the location of the cell, before performing a subsequent communication and so the loss may not be associated with that cell.

The method for detecting the loss of service will be explained in more detail with reference to FIGS. 2, 3 and 4.

Figure 2:
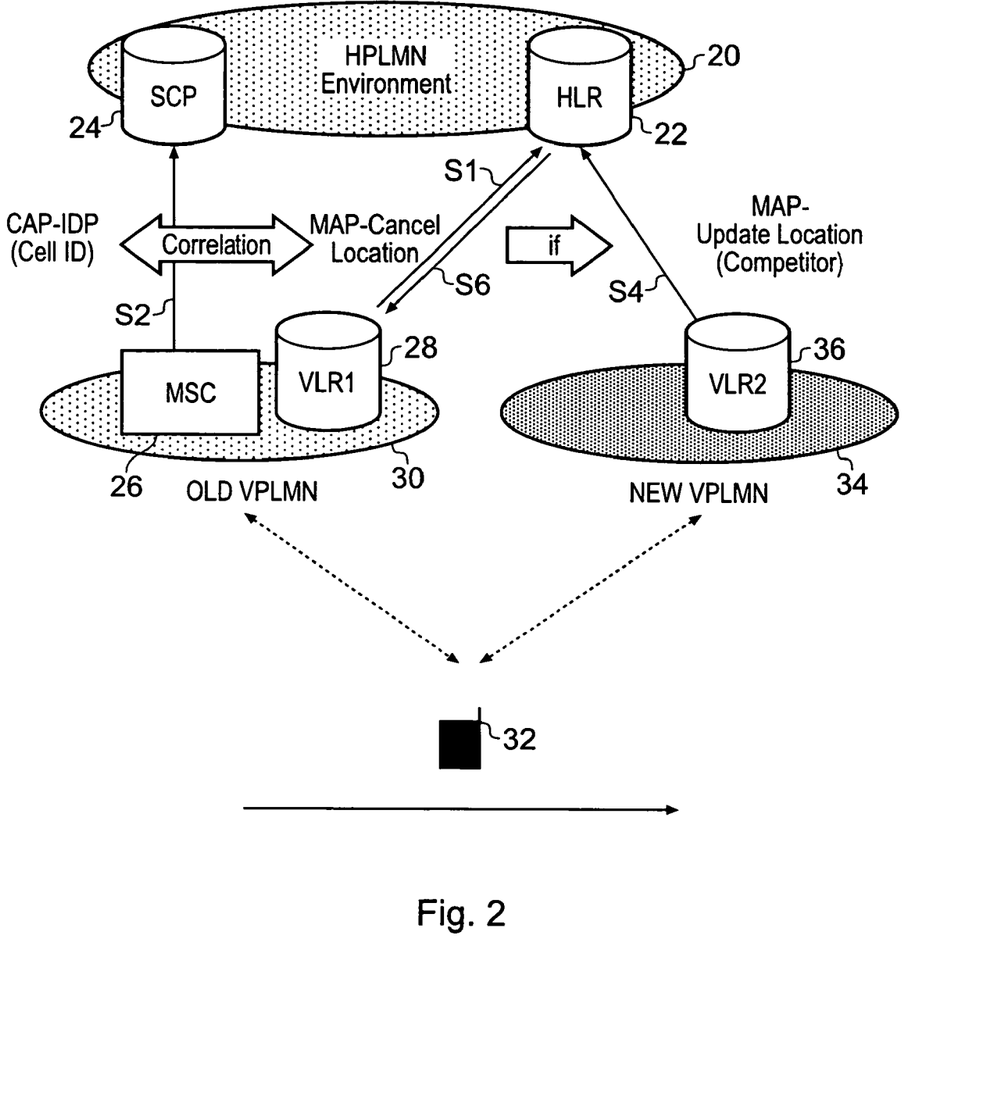
FIG. 2 is a schematic illustration of a combination of signalling communications, which are detected to represent a loss of service event.
Figure 3:
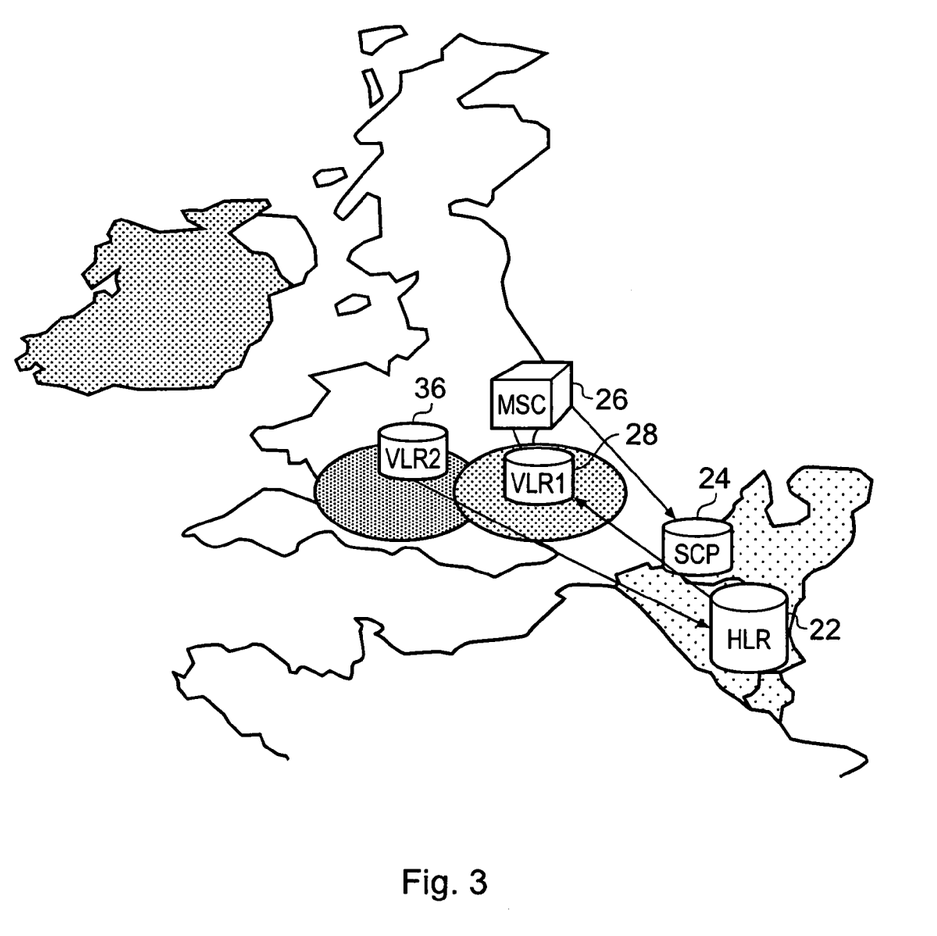
FIG. 3 is a schematic representation showing a relative example location of a home mobile network, a visited mobile network which is being analysed and a further visited mobile network to which communications may be lost from the analysed network.

FIG. 2 provides a somewhat schematic block diagram illustrating a technique for detecting the loss of service according to an embodiment of the present technique. In FIG. 2 parts belonging to a Home Public Land Mobile Network (HPLMN) referred to as a home network of mobile subscribers 20 are shown to include an HLR 22 and a Service Control Point (SCP) 24. The HLR 22 and the SCP 24 are parts with respect to which signalling data is captured by the signal capture apparatus 14 shown in FIG. 1 and with respect to which the loss of service measurement is made. Also shown in FIG. 2 are parts associated with two Visited Public Land Mobile Networks (VPLMN) (referred to as visited mobile networks) to which the mobile user equipment roams. An MSC 26 and a VLR 28 of the first visited network 30 may be deployed in a different geographical area to the home network 20. A mobile user equipment 32 may first communicate via the first visited network 30 and then subsequently communicate via a second visited network 34.

According to an example deployment the home network may provide mobile radio coverage to the mobile user equipment in one country and the first and second visited mobile networks may be deployed in a different country. FIG. 3 illustrates an example where the first and second visited networks are deployed in the United Kingdom whereas the subscriber's home network is deployed in Belgium. As users roam from Belgium to the UK, for example if travelling via passenger ferry or via the Channel Tunnel, then as soon as subscribers make a mobile communication from within the United Kingdom, then various signalling messages are communicated to the home network to register the mobile user equipment as having roamed to, for example, the first visited mobile network 30.

According to the present technique a loss of communications traffic from the first visited network to the second visited network or indeed another visited network is detected, by correlating a MAP location update signalling data with a MAP cancel location signalling data. This correlation is done to ensure that a mobile subscriber was lost to a competitor network, rather than for example returning to the home network or roaming to another country. From the lost communications from subscribers, a distribution identifying a relative area of loss is provided by identifying a cell with respect to which each lost mobile user equipment made a mobile originated call.

The mobile network shown in FIG. 1 according to the present technique will correspond to the home network of the mobile subscribers. Within the home network the signalling capture apparatus 14 captures Signalling System 7 (SS7) signalling data which are communicated from the MSC and the HLR of the home network. The capture of signalling data to for example an STP 12 can be effected by known systems such as those for example supplied by Steleus™, Agilent™, Techtronics™, and Inet™. As illustrated in FIG. 1 the signalling data captured by the signal capture apparatus 14 is received by an analysing data processor 10 for performing the present technique.

As illustrated in FIG. 2 example process steps are illustrated which represent actions, which are performed when a mobile user equipment, which, having been registered with a mobile network being analysed, is lost to another network. The loss would therefore represent an event, which would be counted to contribute as a relative measure of loss for that cell. As will be explained with reference to FIGS. 2 and 3, the event is identified by correlating signalling data detected by the signalling capture apparatus 14 and analysed by the data analysing processor 10. The actions representing a loss of communication event are illustrated in FIG. 2 and are summarised as follows:

S1: The mobile user equipment 32 having roamed to a coverage area of a visited mobile network being analysed 30, performs a location up-date to register the VLR1 28 of the visited network 30 with the HLR of the subscriber of the mobile user equipment's home network 20.

S2: The mobile user equipment 32 performs a mobile originated communication. As a result signalling data representing a CAP IDP communication is communicated between the MSC 26 of the first visited mobile network 20 and the SCP 24 of the home network. The CAP IDP signalling data will be referred to in the description of the present technique as service signalling data, since this signalling data is used to identify an event which counts as a loss of a communication. According to the Customised Applications for Mobile network Enhanced Logic (CAMEL) defined in the 3GPP TS23.078 standard, a CAP DP communication includes:

The International Mobile Subscriber Identifier (IMSI)

An identifier of the cell from which communication was originated

S4: If having made a first communication via the first visited mobile network, the mobile user equipment 32 then makes a subsequent communication via a second visited mobile network 34 then communication via the first mobile network will have been lost. As a result, the virtual location register VLR2 36 of the second visited network will communicate MAP update location signalling data to the HLR 22 of the home network to register the VLR2 36 as the location of the mobile user equipment 32.

S6: Having received the location update for the mobile user equipment to the second network 24, the HLR 22 of the home network will communicate MAP cancel location signalling data to the VLR of the first visited network VLRI 28 to cancel the mobile user equipment 32 from the VLRI 28.

As explained above, the signalling capture apparatus 14 captures the signalling data generated in response to the actions which follow a loss of service event shown in FIG. 2. Furthermore a time at which the signalling data are captured, and in particular the signalling data according to step S4 and the signalling data according to step S6 is determined at point of capture by the signal capture apparatus 14.

Figure 4:
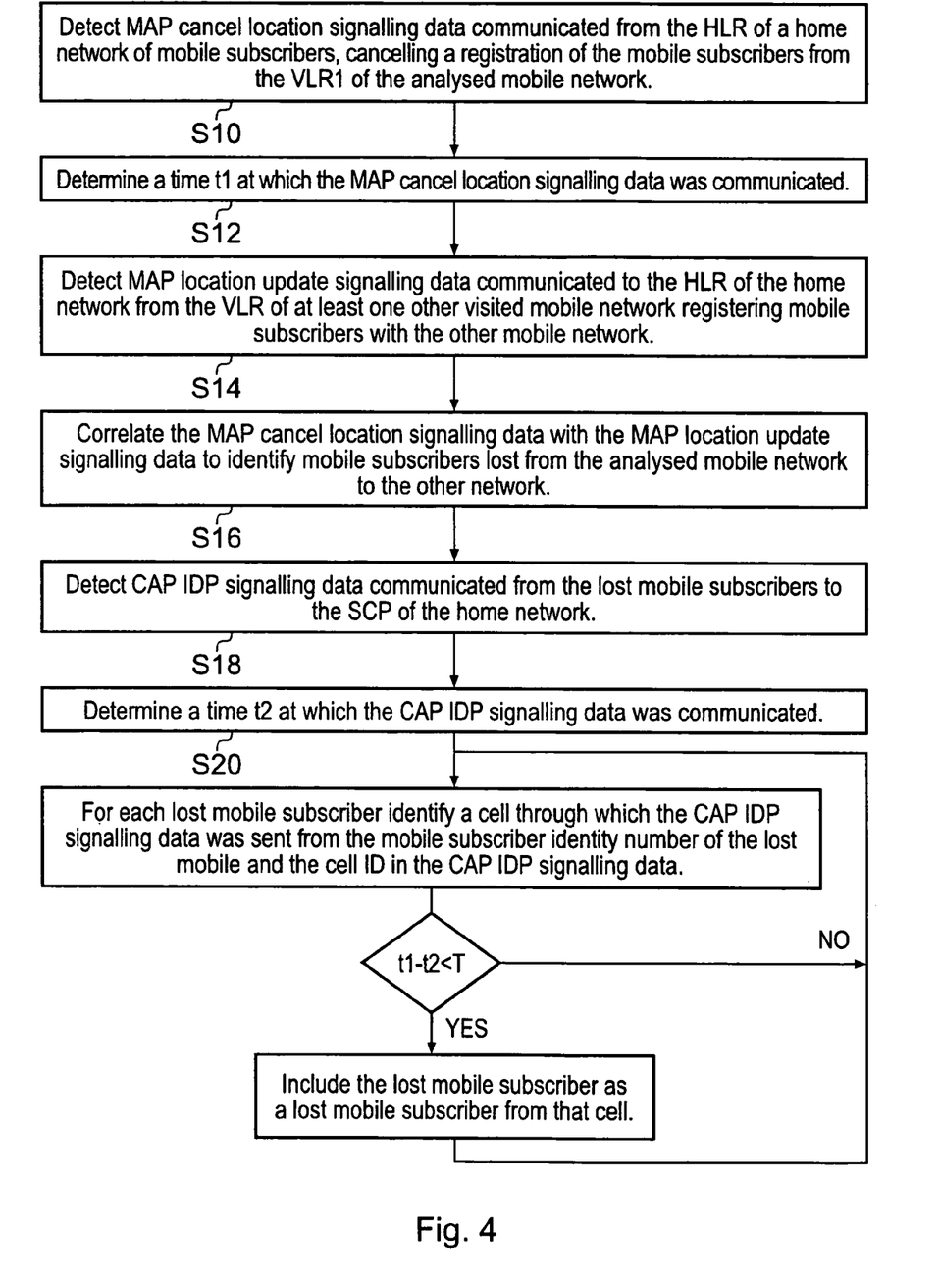
FIG. 4 is a flow diagram illustrating an example method for detecting a relative loss of service according to an embodiment of the present technique.

Having identified the series of actions which generate the signalling data from which the loss of service can be detected, a flow diagram illustrating the method performed by the analysing data processor 10 in FIG. 10 according to the present technique is shown in FIG. 4. FIG. 4 is summarised as follows:

S10: MAP cancel location signalling data is detected which represents a MAP cancellation of the location of user equipment of mobile subscribers sent from the HLR of the home network to the first VLR of the first visited network being analysed.

S12: A time at which the MAP cancel location signalling data is detect is captured and associated with the MAP cancel location signalling data.

S14: MAP location update signalling data is detected which represents a location update from a competitor network. The location update therefore informs the HLR of the home network of an update of the location of the mobile subscribers' user equipment from a first VLR of the first visited network to a second VLR of the second visited network.

S16: The MAP cancel location signalling data and the MAP location update signalling data are correlated to identify, from the International Mobile Subscriber Identity (IMSI) of the mobile user equipment, those mobile subscribers which are lost from the analysed network to at least one other network.

S18: CAP IDP service signalling data is detected. The CAP IDP service signalling data are generated from calls made by mobile user equipment as part of service provisioning according to the CAMEL standard.

S20: A time t2, at which the CAP IDP is detected, is captured and associated with the CAP IDP signalling data.

S22: For each of the mobile subscribers which are identified as having been lost from the analysed mobile network in step S16, the CAP IDP service signalling data is identified using the International Mobile Subscriber Identifier (IMSI). From the CAP IDP the cell ID of the cell from which the CAP IDP signalling data was communicated and a time t2 at which the signalling data was detected is identified.

S24: The time t2 between the capture of the CAP IDP signalling data and the time t1 of the capture of the MAP cancel location signalling data is compared with a predetermined time window T.

S20: If the MAP cancel location signalling data was detected within a predetermined time T then one is added to the loss of communication of a user equipment for the cell identified by the cell ID. Accordingly, an accumulation of the number of mobile user equipment lost following an update of the HLR from the first VLR VLR1 to the second VLR VLR2 with respect to time provides a measure of the loss of service to the particular cell provided this is within a predetermined time. In other embodiments a time at which the MAP location update signalling data may be compared with the time of capture of the CAP IDP to determine an accuracy of the loss of mobile communications from a given cell.

Figure 5:
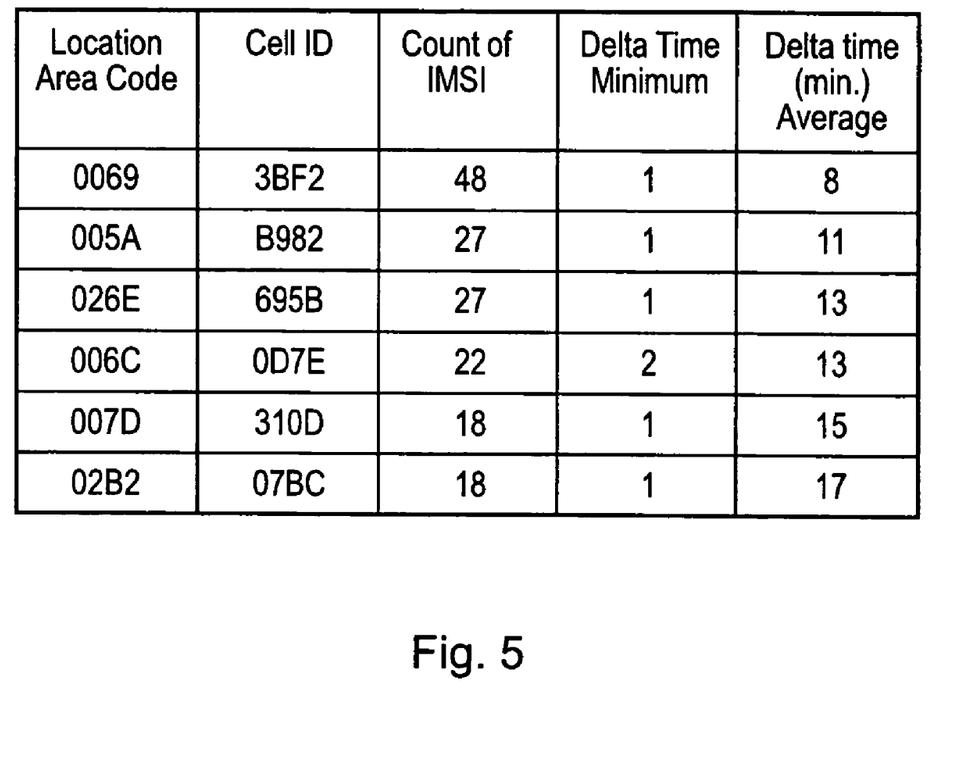
FIG. 5 is a table providing illustrative results for an analysed mobile network.

FIG. 5 provides an example of results, which have been generated for an analysed network in the United Kingdom. In a first column a location area code served by a VLR of the network is indicated with a cell ID in the second column of a cell for which results identifying loss of communications to other networks have been determined. In a third column a number of IMSI subscriber identifiers is provided to indicate that the results gathered for that cell have not been artificially distorted by a single mobile switching between the analysed network and another network more than once, as a result for example of a malfunction. The fourth column provides an indication in minutes of a minimum time between the detection of the CAP IDP signalling data and the MAP cancel location signalling data for all the mobile subscribers detected as being lost for the cell concerned. The fifth column provides an indication of an average time between the detection of the CAP IDP signalling data and the MAP cancel location signalling data in minutes for the mobile subscribers detected as being lost from that identified in the second column.

Figure 6:
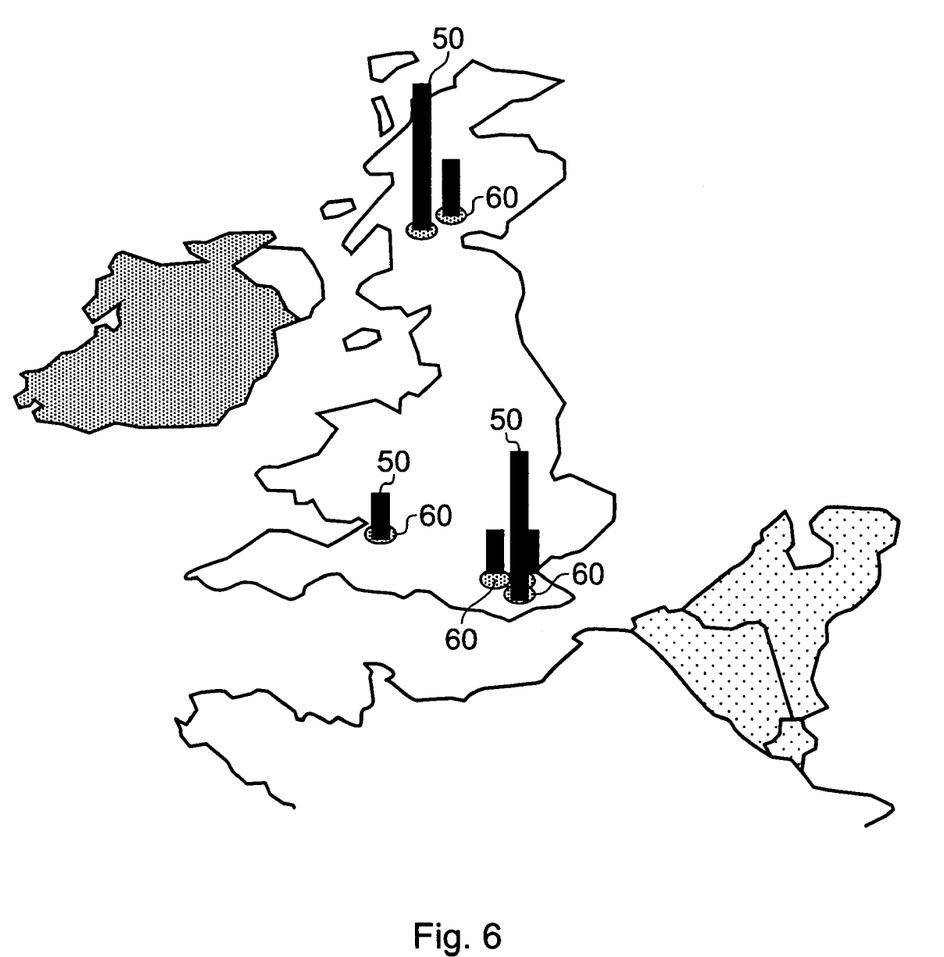
FIG. 6 is an example of a representation of results from an analysed network showing a relative loss and a relative location of the loss of service.

As will be appreciated, the location area code and the cell identifier provide an indication of the geographical location in the coverage area of the mobile network where communications are being lost. A representation of the loss of communication information can therefore be presented to introduce an appropriate remedy. An illustrative technique for representing relative areas of loss of communications is provided in FIG. 6. The results presented in FIG. 6 are illustrative only since, as will be appreciated, the loss of communications within a mobile network represents commercially sensitive information and should therefore not be disclosed. However, the results are provided to illustrate an application of embodiments of the present technique for improving radio communications coverage within a mobile network. As illustrated from FIG. 6 the cell ID can be used to identify an area within the United Kingdom from which a loss of one or more mobile user equipment has occurred. The number of mobile user equipment lost within a predetermined sample time is represented as the height of a column 50, which is positioned with respect to the location of the cell where the loss occurred. As illustrated therefore a significant loss occurs in the region of the South East of England associate with arrival of subscribers from Belgium via, for example, the channel tunnel, the cross-channel ferry or by aeroplane. Correspondingly, there is a significant loss of subscribers in the region of Glasgow and Edinburgh for example where subscribers are flying from Belgium to Scotland.

As will be appreciated there are various techniques for improving radio coverage once the location of a loss of service has been identified. For example, the coverage area may be improved by increasing a number of base stations, improving the diversity of detection and transmission of radio signals from base stations and/or sectoring a cell.

Various modifications may be made to the embodiments herein before described without departing from the scope of the present invention. It will be appreciated that embodiments of the present technique find application with any type of mobile radio network and should not be considered to be limited to the GSM standard.

The invention claimed is:

1. A method of identifying areas for improving radio communications coverage in a mobile radio network under analysis, the method comprising detecting cancel location signalling data communicated between a home subscriber database of a home mobile network of mobile user equipment and a visitor subscriber database of the analysed mobile radio network cancelling a registration of the mobile user equipment from the visitor subscriber database of the analysed mobile radio network, the cancel location signalling data including mobile subscriber identifiers of the mobile user equipment, detecting location update signalling data informing the home subscriber database of the home network that the mobile user equipment is to be registered as having roamed to a visitor subscriber database of at least one other mobile network, the location update including identifiers of the visitor subscriber database and the mobile subscriber identifiers of the user equipment being registered, detecting service signalling data associated with mobile originated calls made by the mobile user equipment to the analysed mobile network, the service signalling data including mobile subscriber identifiers of the mobile user equipment and identifiers of cells of the analysed mobile radio network from which the mobile originated calls were made, correlating the cancel location signalling data and the update location signalling data with respect to the mobile subscriber identifiers of the mobile user equipment to identify mobile subscribers lost to the other mobile network, and identifying areas of relative loss of service of the analysed mobile radio network by identifying, from the mobile subscriber identifiers, a number of the lost mobile subscribers which had made mobile originated calls via cells identified by the cell identifiers of the service signalling data.

2. A method as claimed in caim 1, wherein the identifying the areas of the relative loss of service, comprises identifying the number of mobile user equipment of the analysed mobile radio network making mobile originated calls via cells identified by the cell identifiers which are subsequently registered with the other mobile radio network as indicated by the update location signalling data within a predetermined time associated with a likely distance that the user equipment may travel from the cell identified by the cell identifier between making the mobile originated call and registering with the other mobile network.

3. A method as claimed in claim 1, wherein the identifying the areas of relative loss of service, comprises identifying the number of mobile user equipment of the analysed mobile radio network making mobile originated calls via cells identified by the cell identifiers for which registration is subsequently cancelled from the analysed mobile radio network as indicated by the cancel location signalling data within a predetermined time associated with a likely distance that the user equipment may travel from the cell identified by the cell identifier between making the mobile originated call and cancelling the registration from the analysed mobile network.

4. A method as claimed in claim 1, wherein the service associated with the service signalling data is generated within the analysed mobile radio network for communication to a service control point within the home network as part of a Customisation Application Mobility Enhanced Logic procedure.

5. A method as claimed in claim 1, wherein the update location and the cancel location signalling data are generated as part of a Mobile Application Part signalling protocol.

6. A method as claimed in claim 1, wherein the home subscriber database is a home location register of a mobile radio network and the visitor subscriber databases are virtual location registers.

7. A system for identifying areas for improving radio communications coverage in a mobile radio network under analysis, the system comprising a signalling probe apparatus operable to detect cancel location signalling data communicated between a home subscriber database of a home mobile network of mobile user equipment and a visitor subscriber database of the analysed mobile radio network cancelling a registration of the mobile user equipment from the visitor subscriber database of the analysed mobile radio network, the cancel location signalling data including mobile subscriber identifiers of the mobile user equipment, to detect location update signalling data informing the home subscriber database of the home network that the mobile user equipment is to be registered as having roamed to a visitor subscriber database of at least one other mobile network, the location update signalling data including identifiers of the visitor subscriber database and the mobile subscriber identifier of the user equipment being registered, and to detect service signalling data associated with mobile originated calls made by mobile user equipment to the mobile radio network being analysed, the service signalling data including mobile subscriber identifiers of the mobile user equipment and identifiers of cells of the analysed mobile radio network from which the mobile originated calls were made, and a data analysing processor operable to correlate the cancel location signalling data and the update location signalling data with respect to the mobile subscriber identifiers of the mobile user equipment to identify mobile subscribers lost to the other mobile network, and to identify areas of relative loss of service of the analysed mobile radio network by identifying, from the mobile subscriber identifiers, a number of the lost mobile subscribers which had made mobile originated calls from cells of the analysed network identified by the cell identifiers of the service signalling data.

8. A system as claimed in claim 7, wherein the data analysing processor is operable to identify the areas of the relative loss of service by identifying the number of mobile user equipment of the analysed mobile radio network making mobile originated calls via cells identified by the cell identifiers which are subsequently registered with the other mobile radio network as indicated by the update location signalling data within a predetermined time associated with a likely distance that the user equipment may travel from the cell identified by the cell identifier between making the mobile originated call and registering with the other mobile network.

9. A system as claimed in claim 7, wherein the data analysing processor is operable to identify the areas of the relative loss of service by identifying the number of mobile user equipment of the analysed mobile radio network making mobile originated calls via cells identified by the cell identifiers for which registration is subsequently cancelled from the analysed mobile radio network as indicated by the cancel location signalling data within a predetermined time associated with a likely distance that the user equipment may travel from the cell identified by the cell identifier between making the mobile originated call and cancelling the registration from the analysed mobile network.

10. A system as claimed in claim 7, wherein the service associated with the service signalling data is generated within the analysed mobile radio network for communication to a service control point within the home network as part of a Customisation Application Mobility Enhanced Logic procedure.

11. A system as claimed in claim 7, wherein the cancel location and the update location signalling data are generated as part of a Mobile Application Part signalling protocol.

12. A system as claimed in claim 7, wherein the home subscriber database is a home location register of a mobile radio network and the visitor subscriber databases are virtual location registers.

13. A data analysing processor operable to identify areas for improving radio communications coverage in a mobile radio network under analysis by receiving cancel location signalling data communicated between a home subscriber database of a home mobile network of mobile user equipment and a visitor subscriber database of the analysed mobile radio network cancelling a registration of the mobile user equipment from the visitor subscriber database of the analysed mobile radio network, the cancel location signalling data including mobile subscriber identifiers of the mobile user equipment, receiving location update signalling data informing the home subscriber database of the home network that the mobile user equipment is to be registered as having roamed to a visitor subscriber database of at least one other mobile network, the location update including identifiers of the visitor subscriber database and the mobile subscriber identifier of the user equipment being registered, receiving service signalling data associated with mobile originated calls made by mobile user equipment to the mobile radio network being analysed, the service signalling data including mobile subscriber identifiers of the mobile user equipment and identifiers of cells of the analysed mobile radio network from which the mobile originated calls were made, correlating the cancel location signalling data and the update location signalling data with respect to the mobile subscriber identifiers of the mobile user equipment to identify mobile subscribers lost to the other mobile network, and identifying areas of relative loss of service of the analysed mobile radio network by identifying, from the subscriber identity numbers, a number of the lost mobile subscribers which had made mobile originated calls via cells identified by the cell identifiers of the service signalling data.

14. A data analysing processor as claimed in claim 13, wherein the identifying the areas of the relative loss of service, comprises identifying the number of mobile user equipment of the analysed mobile radio network making mobile originated calls via cells identified by the cell identifiers and which are subsequently registered with the other mobile radio network as indicated by the update location signalling within a predetermined time associated with a likely distance that the user equipment may travel from the cell identified by the cell identifier between making the mobile originated call and registering with the other mobile network.

15. A data analysing processor as claimed in claim 13, wherein the identifying the areas of the relative loss of service, comprises identifying the number of mobile user equipment of the analysed mobile radio network making mobile originated calls via cells identified by the cell identifiers and from which registration is subsequently cancelled from the analysed mobile network as indicated by the cancel location signalling data within a predetermined time associated with a likely distance that the user equipment may travel from the cell identified by the cell identifier between making the mobile originated call and cancelling the registration with the analysed mobile network.

16. A computer readable medium having stored thereon a plurality of sequences of instructions to identify areas for improving radio communications coverage in a mobile radio network under analysis, including sequences of instructions which, when executed by a data processor cause the data processor to perform:

detecting cancel location signalling data communicated between a home subscriber database of a home mobile network of mobile user equipment and a visitor subscriber database of the analysed mobile radio network cancelling a registration of the mobile user equipment from the visitor subscriber database of the analysed mobile radio network, the cancel location signalling data including mobile subscriber identifiers of the mobile user equipment, detecting location update signalling data informing the home subscriber database of the home network that the mobile user equipment is to be registered as having roamed to a visitor subscriber database of at least one other mobile network, the location update including identifiers of the visitor subscriber database and the mobile subscriber identifiers of the user equipment being registered.

detecting service signalling data associated with mobile originated calls made by the mobile user equipment to the analysed mobile network, the service signalling data including mobile subscriber identifiers of the mobile user equipment and identifiers of cells of the analysed mobile radio network from which the mobile originated calls were made, correlating the cancel location signalling data and the update location signalling data with respect to the mobile subscriber identifiers of the mobile user equipment to identify mobile subscribers lost to the other mobile network, and identifying areas of relative loss of service of the analysed mobile radio network by identifying, from the mobile subscriber identifiers, a number of the lost mobile subscribers which had made mobile originated calls via cells identified by the cell identifiers of the service signalling data.

* * * * *

UNITED STATES PATENT AND TRADEMARK OFFICE
CERTIFICATE OF CORRECTION

PATENT NO. : 7,248,871 B2 Page 1 of 1
APPLICATION NO. : 11/140116
DATED : July 24, 2007
INVENTOR(S) : Marc Balon et al.

It is certified that error appears in the above-identified patent and that said Letters Patent is hereby corrected as shown below:

IN THE PATENT COVER SHEET

In Item (30) Foreign Application Priority Data, replace "04291347" with --04291347.5--.

Signed and Sealed this

Twenty-fifth Day of September, 2007

JON W. DUDAS
*Director of the United States Patent and Trademark Office*